(12) United States Patent
Wallach

(10) Patent No.: US 6,820,475 B2
(45) Date of Patent: Nov. 23, 2004

(54) WHEEL COVER

(76) Inventor: Mark K. Wallach, 101, Gedney, Nyack-on-the-Hudson, NY (US) 10960

( * ) Notice: Subject to any disclaimer, the term of this patent is extended or adjusted under 35 U.S.C. 154(b) by 132 days.

(21) Appl. No.: 10/228,027

(22) Filed: Aug. 26, 2002

(65) Prior Publication Data

US 2003/0051545 A1 Mar. 20, 2003

Related U.S. Application Data

(60) Provisional application No. 60/315,205, filed on Aug. 27, 2001.

(51) Int. Cl.[7] .............................. B60B 7/00; G01M 17/02
(52) U.S. Cl. ................. 73/146; 301/37.101; 301/37.38; 301/108.1; 301/108.4
(58) Field of Search ............................... 73/146–146.8; 301/37.101, 37.38, 108.1, 108.4

(56) References Cited

U.S. PATENT DOCUMENTS

| | | | | |
|---|---|---|---|---|
| 2,800,795 A | | 7/1957 | Frederick | |
| 4,620,616 A | * | 11/1986 | Martin | 188/71.6 |
| 4,700,813 A | * | 10/1987 | Rath | 188/18 A |
| 4,950,035 A | * | 8/1990 | Villarreal et al. | 301/6.3 |
| 4,953,395 A | * | 9/1990 | Jard | 73/146.8 |
| 5,100,206 A | * | 3/1992 | Feng | 301/37.108 |
| 5,770,797 A | * | 6/1998 | Lapohn | 73/146.8 |
| 5,803,552 A | * | 9/1998 | Kato et al. | 301/37.41 |
| 5,820,225 A | * | 10/1998 | Ferriss et al. | 301/37.371 |
| 6,517,168 B1 | * | 2/2003 | Van Houten | 301/37.42 |

FOREIGN PATENT DOCUMENTS

| | | |
|---|---|---|
| DE | 3340816 C1 | 9/1984 |
| EP | 0970821 | 1/2000 |
| GB | 2242873 | 10/1991 |

* cited by examiner

Primary Examiner—Edward Lefkowitz
Assistant Examiner—Jermaine Jenkins
(74) Attorney, Agent, or Firm—Honigman Miller Schwartz and Cohn LLP

(57) ABSTRACT

A wheel cover is disclosed. The wheel cover reduces the drag and operating temperatures of a tire/wheel arrangement. The wheel cover includes an exhaust port, a bridge section located over the exhaust port, and a pressure sensor arrangement disposed on the bridge section.

15 Claims, 4 Drawing Sheets

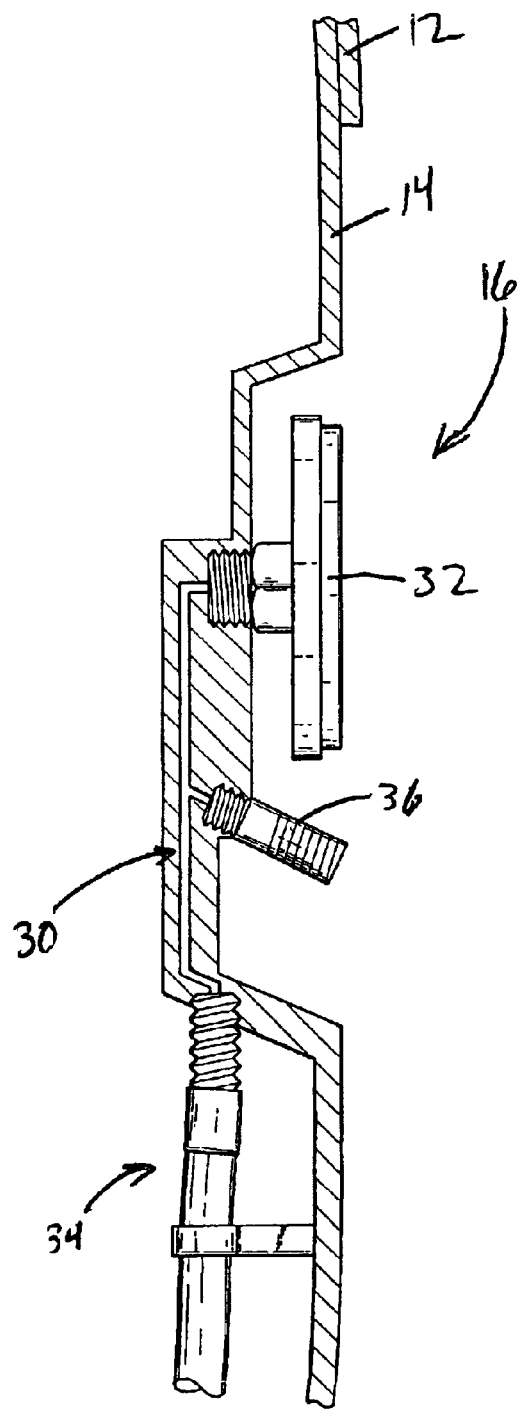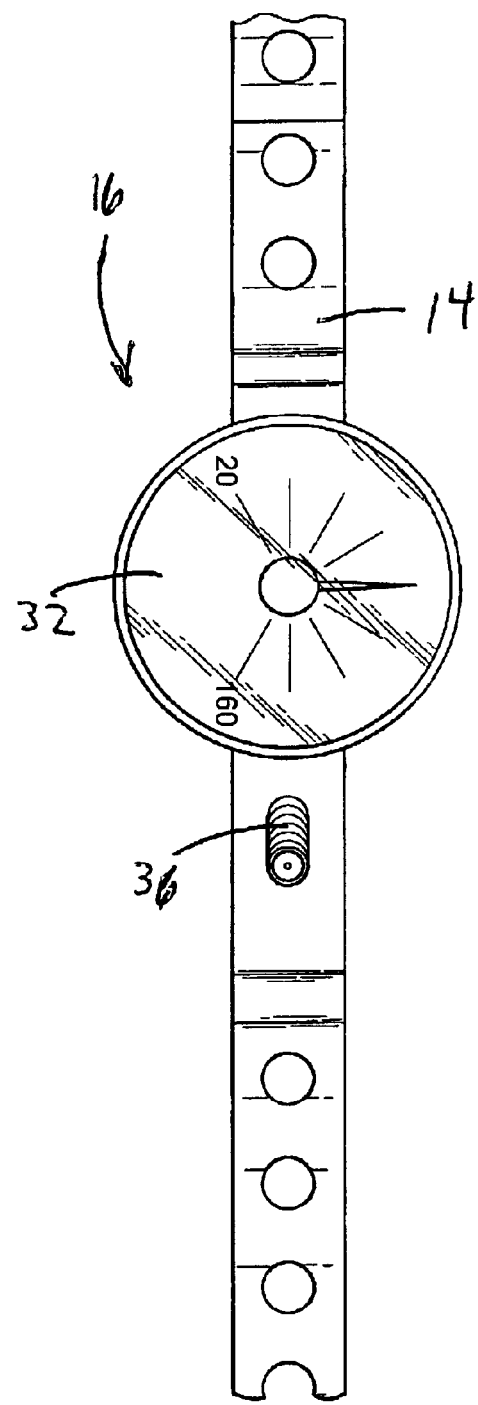
FIG - 3  FIG - 4

WHEEL COVER

RELATED APPLICATIONS

This application claims priority to U.S. Provisional Application No. 60/315,205 filed Aug. 27, 2001.

TECHNICAL FIELD

The present invention relates to tire/wheel arrangements. More specifically, the invention relates to an aerodynamic wheel cover that reduces drag and lowers the operating temperature of the tire/wheel arrangement.

BACKGROUND OF THE INVENTION

Typical tire/wheel arrangements for heavy duty roadway vehicles, such as tractors, trailers, and trucks have to contend with situations relating to the optimal performance of the vehicle. A nut and bolt assembly, which typically extends from the wheel rim, may cause drag and effect the optimal performance of the vehicle, such as for example, fuel consumption. Even further, during the traveling or braking of the vehicle, the tire/wheel arrangement may have a high operating temperature. The high operating temperature may have an undesirable effect on vehicle performance or pressure losses in the tire. Even further, in certain trucking applications, such as in the hauling of hazardous materials, the Department of Transportation (DOT) requires certain safety standards on the monitoring of tire pressure. The DOT requires that trucks are to stop every two hours or every 100 miles in order to check the air pressure on every tire. Because such trucks are frequently stopped so that the tires may be checked for pressure losses, a vehicle operator may have to periodically pressurize the tires.

Thus, there is a need for a new tire/wheel arrangement that permits and maintains an optimal performance of the vehicle by reducing drag and lowering the operating temperature of the tire/wheel arrangement.

SUMMARY OF THE INVENTION

In a first embodiment of the invention, a tire/wheel arrangement including a tire, a valve stem, a wheel rim, and a plurality of nut and bolt assemblies is described. The tire/wheel arrangement comprises a wheel cover, a bridge section, and a pressure sensor arrangement. The wheel cover reduces the drag and operating temperatures of the tire/wheel arrangement. The wheel cover includes an exhaust port. The bridge section is located over the exhaust port. The pressure sensor arrangement is disposed on the bridge section.

A second embodiment of the invention is a tire/wheel arrangement including a tire, a valve stem, a wheel rim, and a plurality of nut and bolt assemblies. In this embodiment, the tire/wheel arrangement also comprises a plurality of reflectors. The wheel cover is fastened to the wheel rim by a fastener. The wheel rim is defined by a diameter, a depth, and an elliptically-shaped dome that reduces drag and creates a low pressure by a Bernoulli effect that causes warm air generated by the vehicle in the area of the tire/wheel arrangement to be evacuated from the wheel cover through an exhaust port diameter. The bridge section is located over the exhaust port diameter. The pressure sensor arrangement is disposed on the bridge section. The pressure sensor arrangement includes a gauge and a valve arrangement. The valve arrangement includes an intake valve and a valve and hose arrangement connected to the valve stem Various additional aspects and advantages of this invention will become apparent to those skilled in the art from the following detailed description of the preferred embodiment, when read in light of the accompanying drawings.

BRIEF DESCRIPTION OF THE DRAWINGS

FIG. 3 is a magnified view of a tire pressure arrangement according to FIG. 2;

FIG. 4 is a top view of the tire pressure arrangement according to FIG. 3;

DETAILED DESCRIPTION OF THE PREFERRED EMBODIMENTS

Figure 1:
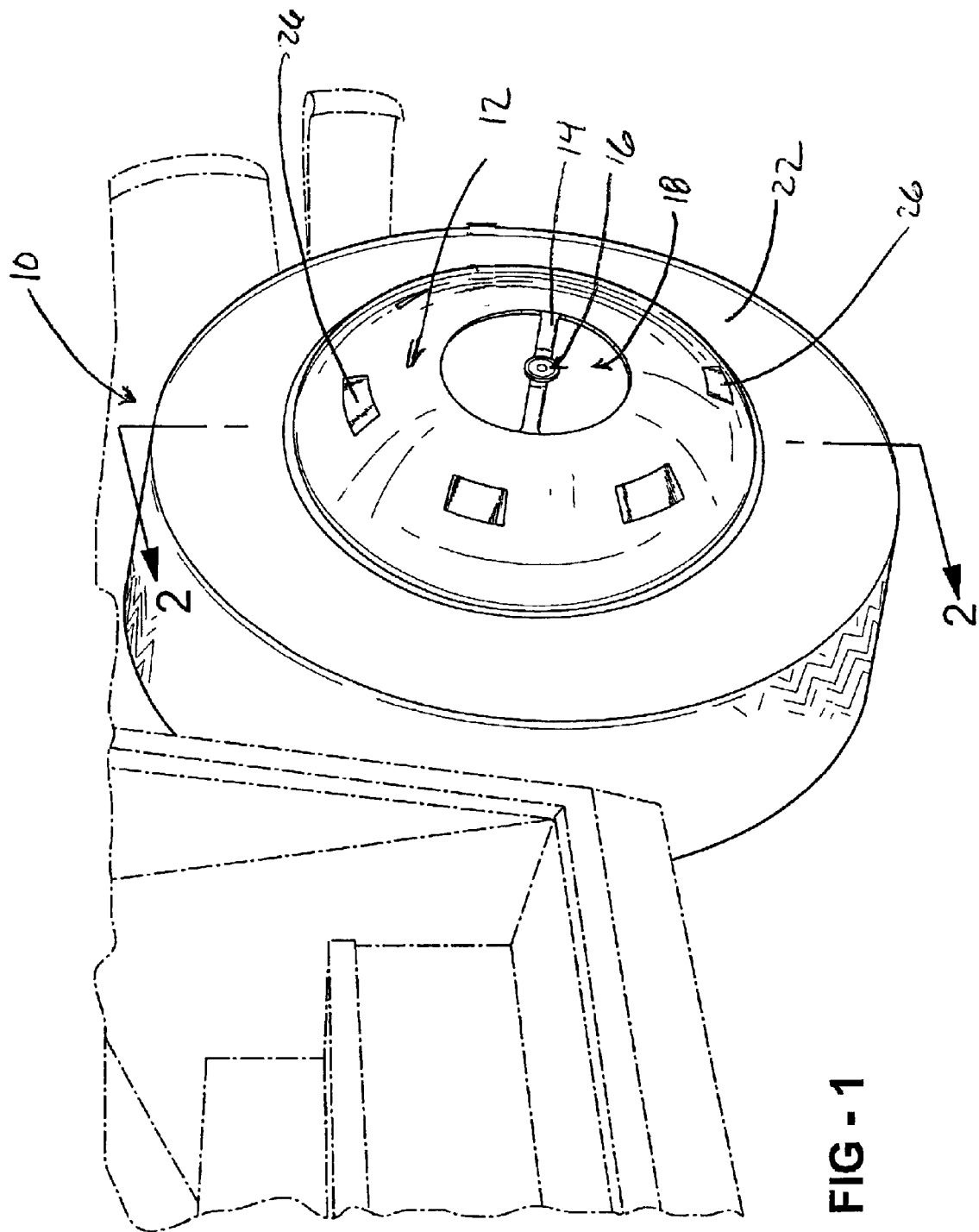
FIG. 1 is a perspective view of an aerodynamic wheel cover according to the present invention.
Figure 2:
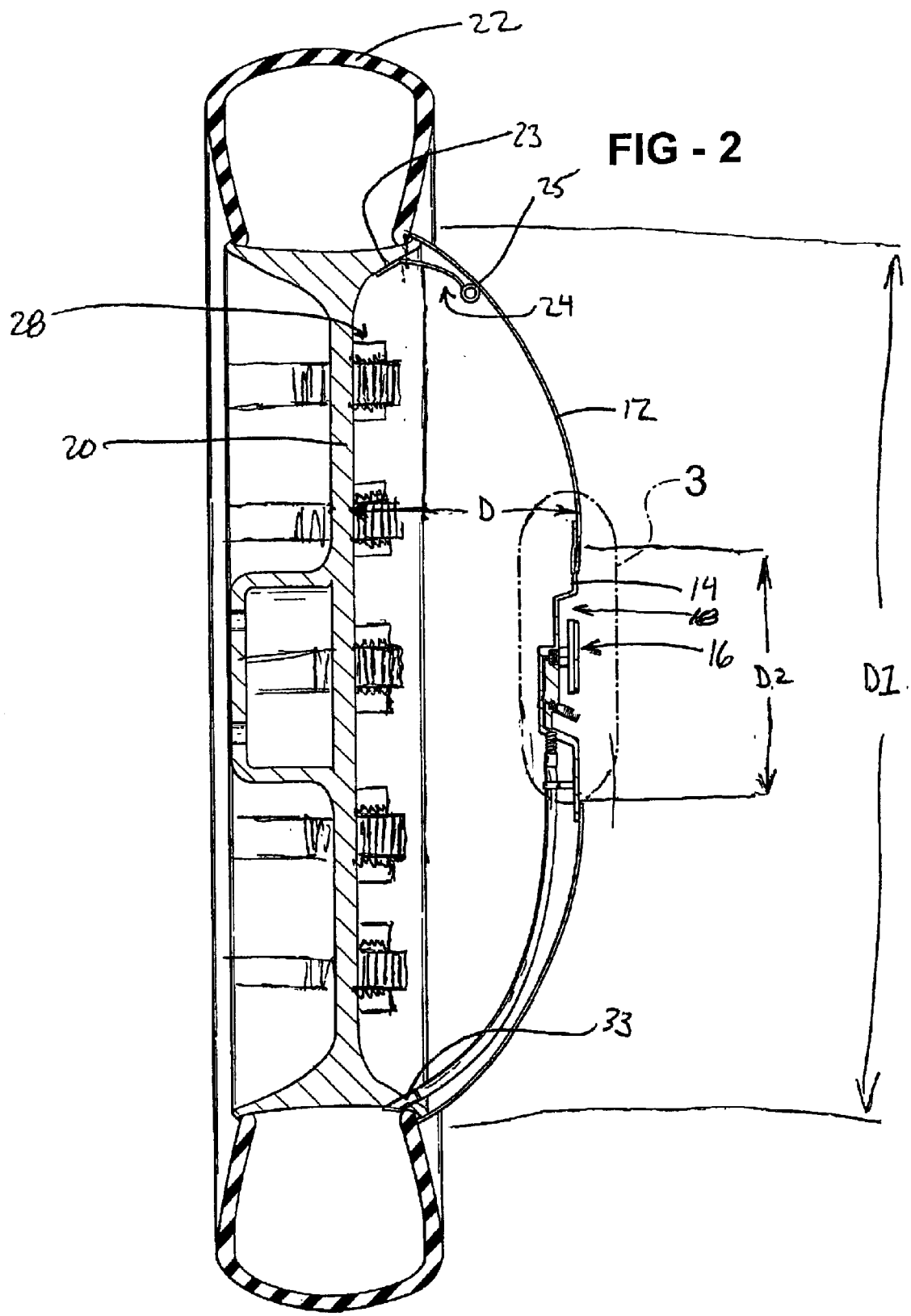
FIG. 2 is a cross-sectional view of the aerodynamic wheel cover according to FIG. 1.

FIG. 1 is a perspective view of a tire/wheel arrangement 10 comprising a wheel cover that is shown generally at 12 including a bridge section 14 with a pressure sensor arrangement 16 disposed over an exhaust port 18 in the wheel cover 12. The wheel cover 12 may also comprise a plurality of reflectors 26 located about the exterior of the wheel cover 12. The wheel cover 12 is fastened to a wheel rim 20 (FIGS. 2 and 5A) about a vehicle tire 22 by fastening means for removably attaching the wheel cover 12 to the wheel rim 20. As seen in FIG. 2, the fastening means may be a fastener 24 that extends from the wheel rim 20 at one end 23 and is located about the circumference of the wheel cover 12 at an opposing end 25.

The fastener 24 may be a wheel clip that is described in non-provisional U.S. patent application Ser. No. 10/228,007 filed on Aug. 26, 2002 and provisional U.S. Patent Application Ser. No. 60/315,190 filed on Aug. 27, 2001, which are incorporated herein by reference. The wheel clip is under assignment to inventor of the present patent application and is commercially available from the Aero-Chex Corporation of Nyack-on-the-Hudson, N.Y. It is also contemplated that other fastening means may include an adhesive tape between the wheel rim 20 and the wheel cover 12 or a plurality of nuts that may be affixed to the interior of the wheel cover 12 through the exhaust port 18. Alternatively, the wheel clip may also be welded, bolted, or adhered to the wheel cover 12 with another suitable manufacturing technique.

The elliptically-shaped dome of the wheel cover 12, which is similar in design to the contour of aircraft wings, improves the aerodynamics and reduces the drag and operating temperatures of the tire/wheel assembly 10. Airflow drag, which is typically exhibited on a plurality nut and bolt assemblies 28 that extend from the wheel rim 20, is diverted from the surface of wheel rim 20 and the nut and bolt assemblies 28 to the exterior surface of the wheel cover 12. The dimensions of the elliptically-shaped dome wheel cover 12 are further defined by an outer diameter, D1, and a depth, D, that extends from the interior surface of the wheel cover 12 to the exterior surface of the wheel rim 20. The wheel cover 12 is also defined by a narrow diameter, D2, of the exhaust port 18 that is approximately located at the apex of the wheel cover 12 in order to desirably maintain a low pressure within the wheel cover 12.

According to one embodiment of the invention, the diameter, D1, and the depth, D, may be approximately 22.5 inches and 6 inches, respectively, and the narrow diameter, D2, of the exhaust port 18 may be approximately 9 inches. The values stated above may apply to a heavy-duty trucking application, such as an eighteen-wheeler trucking application. However, it is intended that the values stated above do not restrict other embodiments of the invention that may be directed to smaller, regular trucking applications whereas the values may be proportionally smaller.

As seen more clearly in FIGS. 3–4, the bridge section 14 with the pressure sensor arrangement 16 includes a valve arrangement 30 (FIG. 3). The bridge section 14 provides mounting means for the pressure sensor arrangement 16, which senses and provides a visible extension of the tire pressure. The pressure sensor arrangement 16 may include a gauge 32 such as a dial gauge or a digital gauge that may tap off of a valve stem 33 (FIG. 2) of the tire 22 by a valve and hose arrangement 34 (FIG. 3) so as to provide tire pressure sensing and indicating while the tire 22 is in motion or at rest. Although not shown, it is contemplated that the pressure sensor arrangement 16 may also be directly attached to the valve stem 33.

The valve arrangement 30 may also comprise an intake valve 36 for pressurizing the tire 22 in the event that the tire 22 is not pressurized to a desirable pressure. Because the tire pressure arrangement 16 rests on the bridge section 14 and is slightly recessed within the exhaust port 18, drag on the wheel cover 12 about the pressure arrangement 16 may also be reduced. The bridge section 14 may be welded, bolted, or fastened to the interior of the wheel cover 12 with any desirable fastening means.

Figure 5A:
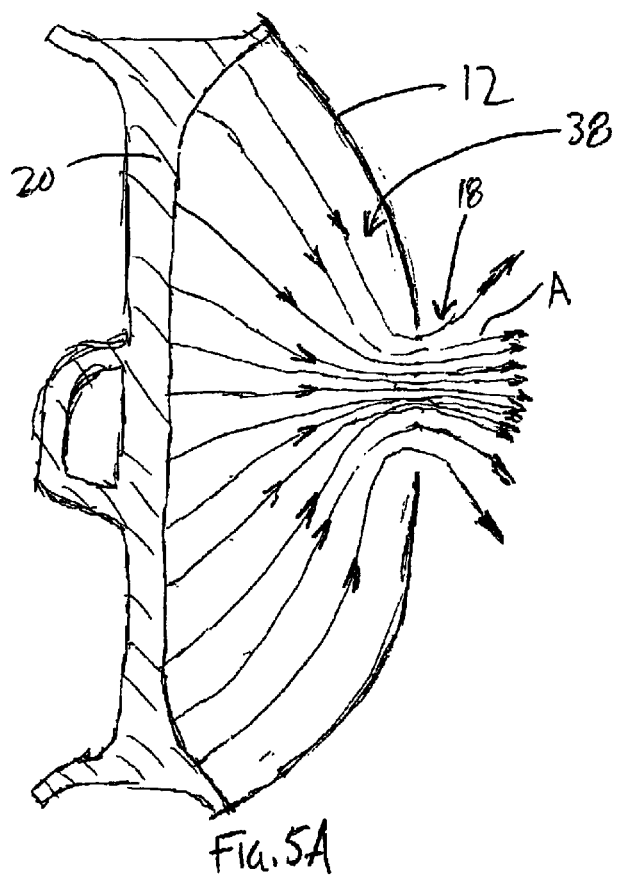
FIGS. 5A illustrates a streamline of airflow as the airflow travels from the inside of the aerodynamic wheel cover of FIG. 1 to an outer environment.

Inclusive to the aerodynamic design of the wheel cover 12, operating temperatures of the tire/wheel assembly 10 may be desirably reduced by the wheel cover exhaust port 18 having the narrow diameter D2. As seen in FIG. 5A, it is contemplated that the operating temperature is reduced through Bernoulli's theorem when streamlines, A, flow from one or a plurality of openings in the wheel rim 20 and out through the exhaust port 18 of the wheel cover 12. Typically, Bernoulli's theorem applies to incompressible fluids in a perfect steady state flow; however, when applying Bernoulli's theorem to the present invention, air is not considered to be incompressible.

Accordingly, when certain conditions are met, such as, if air's velocity is less than 300 km/hour and if there are no pressure differences of more than one tenth of an atmosphere, the air may be considered to be incompressible because its density may remain fairly constant. Even further, gravity may be ignored. According to the present invention, the streamlines, A, of the air are not flowing at great lengths on the order of hundreds of meters. Considering gravity in the current application is inconsequential because the tire/wheel assembly 10 is at the same altitude. Therefore, because the streamlines, A, behave as an incompressible fluid and gravity does not have to be considered, Bernoulli's theorem predicts that the sum of the air's pressure potential and kinetic energy should be constant across a streamline. Thus, if a portion of the streamlines, A, speed up, the air pressure must drop, and if the streamlines, A, slow down, the air pressure must rise.

Accordingly, as seen in FIG. 5A, the curvature of the wheel cover 12 creates a low pressure vacuum chamber 38 about the wheel rim 20 and the inner periphery of the wheel cover 12. The low pressure inside the wheel cover 12 and about the wheel rim 20 causes warm air at atmospheric pressure (i.e. 14.7 psi), which may be generated from the engine or braking system or other vehicle components, to have streamlines, A, accelerate toward the exhaust port 18.

Figure 5B:
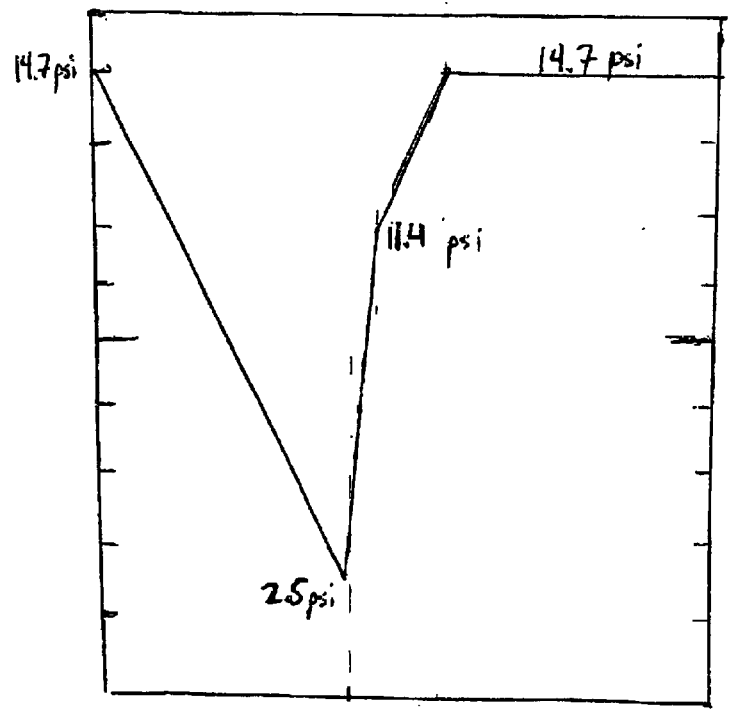
FIG. 5B is a graph representing the air pressure as the airflow's streamlines travels through the aerodynamic wheel cover of FIG. 5A.

Essentially, the narrow diameter, D2, of the exhaust port 18 causes the streamlines, A, of the warm air to bunch tightly together, which thereby indicates a dramatic rise in speed and severe drop in air pressure. For example, as seen in FIG. 5B, a drop in air pressure occurs when the atmospheric pressure near the wheel rim 20 drops from 14.7 psi to approximately 2.5 psi as the streamlines, A, travel the depth, D, of the wheel rim 20 (FIG. 2) toward the exhaust port 18. As seen here, the wheel cover exhaust port 18 acts as a vacuum and permits warm air to evacuate from the tire/wheel assembly 10. While the streamlines, A, of the air leaving the wheel cover 12 may be slightly below atmospheric pressure (e.g. the pressure may be approximately 11.4 psi), it travels fast enough such that most of its total energy is kinetic energy. Referring also to FIG. 5A, as the streamlines, A, flow out of the exhaust port 18, the streamlines, A, spread out; this spreading indicates that the streamlines, A, are slowing down and exchanging kinetic energy for pressure potential energy. As seen in FIG. 5B, once the streamlines are clear of the wheel cover 12, the streamlines exit to the outer environment and the air's pressure rises to atmospheric pressure (i.e. 14.7 psi).

As shown above, traditionally, the dramatic increase in speed and drop in air pressure occurs for a steady state flow of fluid that passes through a narrow channel, which is called the Venturi Effect. The Venturi effect is a special case of the Bernoulli effect, which recognizes that any increase in a fluid's velocity along a streamline is accomplished by a drop in pressure. Thus, higher temperatures about the wheel rim 20 may be continuously and quickly evacuated from the tire/wheel arrangement 10. By reducing the operating temperatures in this manner, a consistent operating temperature and tire pressure may occur during vehicle operation so as to cool the braking system and enable consistent tire pressures.

Accordingly, the wheel cover 12 offers a plurality of desirable features that enhances the operability of heavy duty roadway vehicles, such as tractors, trailers, and trucks.

While the invention has been specifically described in connection with certain specific embodiments thereof, it is to be understood that this is by way of illustration and not of limitation, and the scope of the appended claims should be construed as broadly as the prior art will permit.

What is claimed is:

1. A vehicle tire/wheel arrangement comprising:
    a wheel cover fastened to a wheel rim for reducing drag and operating temperatures of a tire/wheel arrangement, wherein the wheel cover is elliptical in cross sectional share and includes an exhaust port defined by an opening in said wheel cover,
    wherein the elliptical cross-sectional shape of said wheel cover creates a low pressure vacuum chamber about the wheel rim and causes air within the wheel cover to accelerate toward the exhaust port.

2. The tire/wheel arrangement according to claim 1, wherein the wheel cover further comprises a plurality of reflectors.

3. The tire/wheel arrangement according to claim 1, wherein the wheel cover is fastened to the wheel rim by a fastener.

4. The tire/wheel arrangement according to claim 3, wherein the fastener is a wheel clip.

5. The tire/wheel arrangement according to claim 3, wherein the fastener is double-sided adhesive tape.

6. The tire/wheel arrangement according to claim 3, wherein the fastener is a plurality of nuts that may be affixed to the interior of the wheel cover.

7. The tire/wheel arrangement according to claim 3, wherein the fastener comprises a welding of the wheel cover to the wheel rim.

8. The tire/wheel arrangement according to claim 3, wherein the fastener comprises a bolting of the wheel cover to the wheel rim.

9. The tire/wheel arrangement according to claim 1, wherein the wheel cover is defined by an outer diameter and a depth.

10. The tire/wheel arrangement according to claim 1, wherein the outer diameter is 22.5 inches, the depth is 6 inches, and the diameter of the exhaust port is 9 inches.

11. The tire/wheel arrangement according to claim 1, further comprising a bridge section located over the exhaust port.

12. The tire/wheel arrangement according to claim 11, further comprising a pressure sensor arrangement disposed on the bridge section.

13. The tire/wheel arrangement according to claim 12, wherein the pressure sensor arrangement includes a gauge and a valve arrangement, wherein the valve arrangement includes an intake valve and a valve and hose arrangement connected to the valve stem.

14. A vehicle tire/wheel arrangement including a tire, a valve stem, a wheel, and a plurality of nut and bolt assemblies, comprising:

a wheel cover fastened to the wheel rim by a fastener, wherein the wheel cover is defined by a diameter, a depth, and an elliptically-shaped dome that reduces drag and creates a low pressure by a Bernoulli effect that causes warm air generated by the vehicle in the area of the tire/wheel arrangement to be evacuated from the wheel cover through an exhaust port diameter;

a bridge section located over the exhaust port diameter;

a plurality of reflectors; and a pressure sensor arrangement disposed on the bridge section, wherein the pressure sensor arrangement includes a gauge and a valve arrangement, wherein the valve arrangement includes an intake valve and a valve and hose arrangement connected to the valve stem.

15. The tire/wheel arrangement according to claim 14, wherein the fastener is a wheel clip.

* * * * *